Jan. 28, 1958  G. A. LYON  2,821,438
WHEEL COVER
Filed June 11, 1953
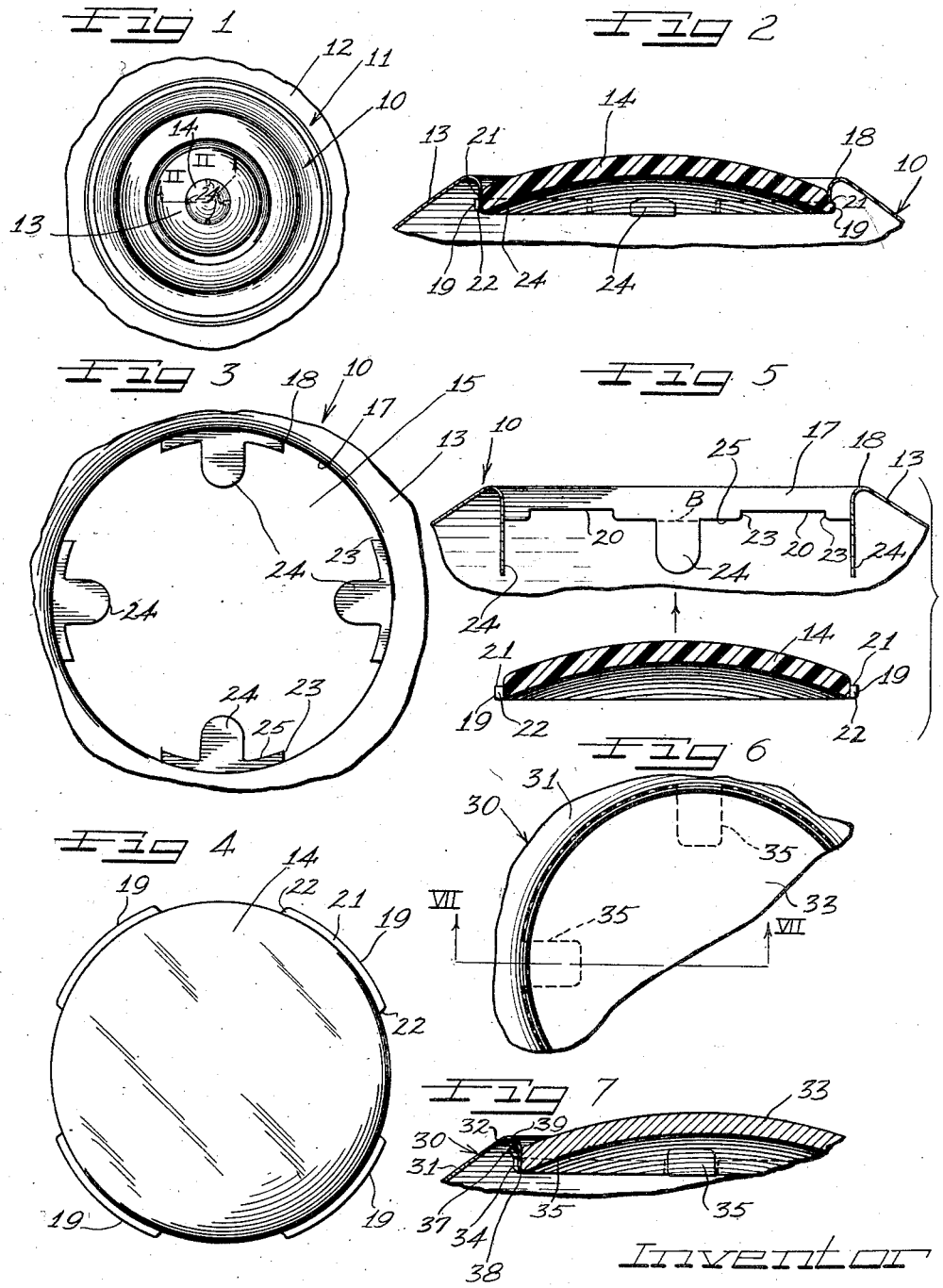
Inventor
George Albert Lyon

United States Patent Office 2,821,438
Patented Jan. 28, 1958

2,821,438
WHEEL COVER
George Albert Lyon, Detroit, Mich.
Application June 11, 1953, Serial No. 360,864
4 Claims. (Cl. 301—37)

The present invention relates to improvements in wheel structures and more particularly concerns the ornamental and protective covering of the outer sides of vehicle wheels.

An important object of the present invention is to provide an improved wheel cover arrangement.

Another object of the invention is to provide a wheel cover with a novel central name plate or medallion construction.

Yet another object of the invention is to provide an improved name plate or medallion structure for wheel covers.

A still further object of the invention is to provide novel means for securing a name plate or medallion disk structure to a wheel cover.

Other objects, features and advantages of the present invention will be readily apparent from the following detailed description of certain preferred embodiments thereof taken in conjunction with the accompanying drawing, in which:

Figure 1 is a side elevational view of a vehicle wheel embodying features of the invention;

Figure 2 is an enlarged fragmentary detail sectional view taken substantially on the line II—II of Figure 1;

Figure 3 is a fragmentary side elevational view of the central portion of the wheel cover showing a preliminary stage in the formation of the name plate or medallion securing means thereof;

Figure 4 is an outer side elevational view of a name plate or medallion member to be assembled with the cover;

Figure 5 is a fragmentary diametrical sectional assembly view of a central portion of a wheel cover and a medallion or name plate member to be assembled therewith;

Figure 6 is a fragmentary side elevational view of a modified wheel cover and name plate or medallion assembly; and Figure 7 is a fragmentary detail sectional view taken substantially on the line VII—VII of Figure 6.

Having reference to Figures 1 and 2, a wheel cover 10 which may be of the full disk type is adapted to be applied to a vehicle wheel 11 which carries a pneumatic tire and tube assembly 12. The cover 10 is preferably of stamped or drawn thin sheet metal such as stainless steel or brass or the like and is appropriately surface finished on the outer side thereof as by plating, burnishing and polishing, and has a central crown portion 13.

It is customary for various automobile manufacturers to have at the centers of the wheel covers applied to their automobiles various insignia of trade mark or model or style designation significance. In an improved manner of applying such insignia or indicia to the wheel cover the present invention provides for the provision of a central name plate or medallion member 14. This member 14 may be made from a resinous plastic material which may be either a thermoplastic or thermo-setting plastic material, lending itself to economical manufacture, ready adaptation to service requirements and compatibility with the material of the cover and the means for connecting the name plate or medallion member in service position on the cover.

By preference, the plastic member 14 is constructed as a light weight concave-convex or inverted dish shaped plate of preferably circular perimeter (Figures 1 and 4). Thereby the member 14 is adapted to be assembled within a complementary central circular opening 15 (Figure 3) in the crown 13 of the wheel cover defined by a cylindrical axially inwardly directed flange 17. Juncture of the cylindrical flange 17 with the crown 13 is preferably effected on a smooth generally axially outwardly directed annular rib-like reenforcing juncture radius 18.

The construction and arrangement of the insert plate member 14 is preferably such with respect to the flange 17 that the member 14 can be assembled from the inner side of the cover outwardly into position, as indicated by the directional arrow in Figure 5. To this end, the perimeter of the insert plate 14 is provided with a laterally, that is radially, extending peripheral flange structure, herein comprising a plurality of equidistantly peripherally spaced flange sections 19 of substantial width and of a reduced thickness compared to the thickness of the body of the plate member 14. Herein the flange lugs or sections 19 are approximately half as thick as the body of the plate 14 and are formed integrally in one piece with the innermost portion of the edge of the plate, shown as at the lower side of the edge in Figures 2 and 5.

Along its inner edge the flange 17 is provided with notches 20 complementary to and receptive of the peripheral flange lugs or sections 19 of the insert plate. In full assembly, respective outwardly facing shoulders 21 on the flange sections 19 engage the inwardly directed edges within the notches 20 while end shoulders 22 on the flange sections oppose end shoulders 23 defining the notches. Thereby the plate 14 is maintained in assembly in predetermined axially outward relation to the flange 17 and is also held against turning relative to the flange 17.

For retaining the insert plate 14 against displacement inwardly from the flange 17, a series of spaced retaining finger or lug extensions 24 are provided on the flange 17 of the cover, initially directed axially inwardly as seen in Figure 5, and after assembly of the insert plate 14 within the flange 17, bent over into locking, retaining engagement with the inner side of the margin of the insert plate, as shown in Figures 1 and 2. By having the depth of the notches 20 substantially equal to or only very slightly shallower than the thickness of the flange sections 19 of the insert plate 14, lower edge portions 25 of the flange 17 will be provided intermediate the notches 20 from which the retaining lugs or fingers 24 preferably extend medially in one piece from the flange. Since the edge 25 lies substantially conterminus with the inner corner defining the perimeter of the insert plate 14, bending of the retaining lug fingers 24 will occur along respective bend lines B aligned with the edge portions 25 of the flange 17 as a bending fulcrum and will thus avoid placing undue compressive pressure against the margin of the insert plate 14. Nevertheless, adequate retaining pressure is applied to the insert plate margin.

In making the wheel cover, the central portion of the crown 13 is drawn to provide the flange 17, and the portion of the crown circumscribed by the circular flange 17 is trimmed out to leave the retaining flange lugs 24 and the contiguous area to provide the innermost edge of the flange 17 lying in a radial plane as shown in Figure 3. Then the fingers 24 and the contiguous radially extending area at the base portions of the fingers are turned axially inwardly to the diameter of the flange 17. This produces the structure shown in Figure 5 ready for assembly of the insert disk or plate 14 with the cover.

In the modification of Figures 6 and 7 a wheel cover 30 is provided with a central crown portion 31 is provided with a central opening defined by a cylindrical axially inwardly directed flange 32. Assembled within the circular aperture thus provided is a plate or disk member 33 of preferably dome or inverted dish shape and provided with a circular perimeter complemenetary to the inside diameter of the flange 32. About its perimeter the disk 33 has a radial flange structure comprising a plurality of flange sections 34 substantially like the flange sections 19 of the insert disk 14, but in this instance substantially wider so as to fit between respective equally circumferentially spaced retaining finger lug extensions 35 from the flange 32.

As best seen in Figure 7, the flange 32 is of uniform width, as indicated in dash outline, except for the retaining finger 35 extending therefrom. The flange projections 34 of the insert disk are of only fractional thickness compared to the thickness of the body of the disk 33 and are provided with outwardly directed respective shoulders 37 which engage against the inner edge of the flange 32 between the fingers 35. The fingers 35 are then bent over along respective bend lines or junctures 38 fulcrumed about the inner corner of the edge of the disk 33 within the notches in the peripheral flange thereof. In this construction, the disk 33 may be of a harder material than the resinous plastic material of the disk 14, such as metal formed as a die casting or forging or the like.

In both forms of the invention, it will be observed that the margin of the disk insert is inset relative to a protective shoulder defined at the juncture of the inturned flange of the cover crown. In Figure 2 it will be observed that the margin of the insert disk 14 is protectively surrounded by the axially outwardly projecting rib-like juncture 18. In the form of Figure 7 the margin of the insert disk 33 is protectively surrounded by an axially outwardly directed annular rib-like juncture 39 of the flange 32 with the crown 31.

It will be understood that modifications and variations may be effected without departing from the scope of the novel concepts of the present invention.

I claim as my invention:

1. In a wheel cover including a circular sheet metal body having a central aperture of substantial diameter therein, said aperture being defined by axially inwardly extending flange structure provided with a plurality of circumferentially spaced axially inwardly opening notches therein alternating with axially inwardly projecting bendable finger or lug extensions, a medallion member having a marginal radially projecting flange structure of larger diameter than said axially extending cover flange structure and provided with radially opening notches with radially projecting portions of the flange structure intermediate said notches engageable within said cover flange notches and with said finger or lug extensions projecting axially inwardly through the radially opening notches in said medallion flange structure, and with the finger or lug extensions bent in behind the medallion to retain the medallion in axial assembly with the cover and in closing relation to said central aperture, while said flange structures due to the interengagement thereof as enabled by said respective notches retain the medallion and the cover against relative turning.

2. In a vehicle wheel cover structure, a circular cover member having a central medallion or name plate aperture, a plurality of circumferentially spaced retaining fingers extending from the margin of the cover member about said aperture to the inner side of the cover, and a medallion or name plate disk dimensioned to close said aperture and having a peripheral series of generally radially projecting flange lugs extending to a larger diameter than said aperture and having faces thereof engageable with the marginal portion of the cover about said aperture between said fingers, said fingers extending inwardly between said flange lugs and engaging behind the margin of the disk to retain the same in closing relation to said aperture.

3. In a wheel cover including a circular body having an axially outer face and an axially inner face and provided with a central opening of substantial diameter, said opening being defined by an axially inturned and axially inwardly extending continuous generally cylindrical flange, said flange having a plurality of circumferentially spaced axially inward retaining finger extensions, and a medallion disk closing said opening and having a radially extending marginal flange structure provided with a plurality of radially opening notches therein and radially projecting flange lugs intermediate the notches, said notches affording clearance for said fingers between said flange lugs, said flange lugs having axially outwardly facing shoulder faces engageable against the edge of said flange between said fingers for determining the axially outward disposition of the disk, said fingers engaging behind said disk and retaining the same against axially inward displacement.

4. In a wheel cover for disposition at the outer side of a vehicle wheel, a circular sheet metal cover body having a central circular opening defined by an axially inwardly extending continuous narrow cylindrical axially inwardly extending flange having a plurality of normally axially inwardly extending integral bendable retaining fingers, and a medallion disk of a diameter to fit closely within said cylindrical flange and of substantial marginal thickness, with radially projecting flange lugs extending from the diameter of the disk adjacent to the inner face of the disk margin and of less thickness than the disk margin for thereby providing axially outwardly facing shoulders on the flange lugs inset relative to the axially outer face of the disk margin, said flange lug shoulders engaging against the edge of said cylindrical flange between said fingers and with the diameter of the disk margin closely continuously opposing the cylindrical flange, said fingers being bent radially inwardly behind the disk margin between said flange lugs and thereby retaining the disk against axially inward displacement.

References Cited in the file of this patent

UNITED STATES PATENTS

| 1,354,512 | Pfeifer | Oct. 5, 1920 |
| 2,188,067 | Trautner | Jan. 23, 1940 |
| 2,593,274 | Dandurand | Apr. 15, 1952 |
| 2,627,359 | Woodward | Feb. 3, 1953 |